US012772046B2

(12) United States Patent
Suo et al.

(10) Patent No.: US 12,772,046 B2
(45) Date of Patent: Oct. 20, 2026

(54) UE CAPABILITY UPDATING METHOD AND APPARATUS, AND DEVICE

(71) Applicant: DATANG MOBILE COMMUNICATIONS EQUIPMENT CO., LTD., Beijing (CN)

(72) Inventors: Shiqiang Suo, Beijing (CN); Xianjun Yang, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 329 days.

(21) Appl. No.: 18/578,718

(22) PCT Filed: Jun. 6, 2022

(86) PCT No.: PCT/CN2022/097213
§ 371 (c)(1),
(2) Date: Jan. 12, 2024

(87) PCT Pub. No.: WO2023/016071
PCT Pub. Date: Feb. 16, 2023

(65) Prior Publication Data

US 2024/0334179 A1 Oct. 3, 2024

(30) Foreign Application Priority Data

Aug. 12, 2021 (CN) ......................... 202110921977.7

(51) Int. Cl.
*H04W 8/24* (2009.01)
*G06N 3/08* (2023.01)
*H04W 76/20* (2018.01)

(52) U.S. Cl.
CPC ................ *H04W 8/24* (2013.01); *G06N 3/08* (2013.01); *H04W 76/20* (2018.02)

(58) Field of Classification Search
CPC ................................. H04W 8/24; G06N 3/08
(Continued)

(56) References Cited

U.S. PATENT DOCUMENTS 10,992,331 B2 * 4/2021 Jassal ....................... G06N 3/09
2020/0327371 A1 10/2020 Sharma et al.
(Continued)

FOREIGN PATENT DOCUMENTS

CN 109451816 A 3/2019
CN 109714794 A 5/2019
(Continued)

OTHER PUBLICATIONS

Notice of Allowance of Corresponding CN Patent Application No. 202110921977.7 dated Jun. 2, 2024.
(Continued)

*Primary Examiner* — Jirapon Tulop
(74) *Attorney, Agent, or Firm* — KILPATRICK TOWNSEND & STOCKTON LLP

(57) ABSTRACT

The present application provides UE capability update methods, apparatuses, and devices. The UE capability update method includes: updating a machine learning model for communication data processing; determining at least one performance indicator associated with UE capability based on processing of communication data according to the updated machine learning model; determining updated UE capability information in response to determining that the UE capability is updated according to the at least one performance indicator; and reporting the updated UE capability information to a network.

20 Claims, 6 Drawing Sheets

(58) Field of Classification Search
USPC .......................................................... 455/418
See application file for complete search history.

(56) References Cited

U.S. PATENT DOCUMENTS

| | | | | |
|---|---|---|---|---|
| 2021/0044488 | A1 | 2/2021 | Wu et al. | |
| 2021/0326726 | A1* | 10/2021 | Wang | G06N 3/084 |
| 2022/0330012 | A1* | 10/2022 | Bai | H04W 8/24 |

FOREIGN PATENT DOCUMENTS

| | | | | |
|---|---|---|---|---|
| CN | 110798847 | A | 2/2020 | |
| CN | 110798883 | A | 2/2020 | |
| CN | 111817832 | A | 10/2020 | |
| CN | 111819872 | A | 10/2020 | |
| CN | 111903113 | A | 11/2020 | |
| CN | 112005565 | A | 11/2020 | |
| CN | 112702784 | A | 4/2021 | |
| EP | 3709688 | A1 * | 9/2020 | H04W 72/20 |
| WO | 2019027687 | A1 | 2/2019 | |
| WO | 2021142609 | A1 | 7/2021 | |

OTHER PUBLICATIONS

Huawei, HiSilicon, ETRI, "KI #19, Sol #56: Update to further clarify ML Model sharing between NWDAF instances", 3GPP TSG-SA WG2 (ARCH) #141e, Tdoc S2-2006919, electronic meeting, Oct. 16, 2020.
European Patent Office, Extended European Search Report Issued in Application No. 22855056.2, Nov. 15, 2024, Germany, 12 pages.
Office Action of Corresponding CN Patent Application No. 202110921977.7 dated Feb. 28, 2025.

* cited by examiner

UE CAPABILITY UPDATING METHOD AND APPARATUS, AND DEVICE

CROSS REFERENCE TO RELATED APPLICATION

The present application is a National Stage of International Application No. PCT/CN2022/097213, filed Jun. 6, 2022 which claims the priority to Chinese patent application No. 202110921977.7 filed with the China National Intellectual Property Administration on Aug. 12, 2021 and entitled “UE Capability Updating Method and Apparatus, and Device”, the entire content of which is incorporated in this application by reference.

FIELD

The present application relates to the field of wireless communication, in particular to UE capability update methods, apparatuses and devices.

BACKGROUND

In the current 5$^{th}$ generation mobile communication technology (5G) communication system, when the network needs additional user equipment (UE) radio access capability information, it initiates a UE capability report for a UE in a radio resource control connected (RRC_CONNECTED) mode. When configuring the UE or scheduling the UE, the network respects radio access capability parameters reported by the UE.

In the current 5G communication system, it is generally assumed that UE capability will not change after RRC connection and reporting of the UE capability. Therefore, when performing scheduling, the network device does not consider whether the UE capability changes. Thus, there may be a situation where the UE capability changes, but the network device still assumes that the UE capability will not change, and still schedules the UE according to the UE capability before the change, which can neither fully utilize the UE capability nor support the service requirements of UE upgrade.

SUMMARY

The present application provides UE capability update methods, apparatuses, and devices. By introducing a method for identifying UE capability changes and reporting updated UE capabilities, the problem of resources waste or unsatisfied service requirements of UE upgrade caused by the network device still scheduling a UE according to original UE capabilities after UE capability upgrades can be solved.

In one embodiment of the present application provides a UE capability update method, including:

updating a machine learning model for communication data processing;

determining at least one performance indicator associated with UE capability based on processing of communication data according to the updated machine learning model;

determining updated UE capability information in response to determining that the UE capability is updated according to the at least one performance indicator; and reporting the updated UE capability information to a network.

In one embodiments, the determining that the UE capability is updated according to the at least one performance indicator, includes at least one of the following operations:

in response to the at least one performance indicator being greater than a corresponding preset threshold, determining that the UE capability is updated;

in response to a change magnitude of the at least one performance indicator being greater than a corresponding preset threshold, determining that the UE capability is updated.

In one embodiments, the determining the updated UE capability information in response to determining that the UE capability is updated according to the at least one performance indicator, includes:

determining a UE capability parameter corresponding to the at least one performance indicator according to a corresponding relationship between different UE capability parameters and performance indicators; and determining an updated UE capability parameter.

In one embodiments, the reporting the updated UE capability information to the network, includes:

reporting the updated UE capability information to the network through RRC IE in RRC information;

where the updated UE capability information includes a mandatory UE capability parameter and an updated UE capability parameter.

In one embodiments, the reporting the updated UE capability information to the network, includes:

triggering the reporting of the updated UE capability information to the network when a reporting condition is met; or initiating a request for reporting the updated UE capability information to the network, and reporting the updated UE capability information when receiving a report permission instruction from the network.

In one embodiments, the triggering the reporting of the updated UE capability information to the network when the reporting condition is met, includes:

triggering the reporting of the updated UE capability information to the network in response to determining that a switch indicates allowing of the reporting of the updated UE capability information, where the switch is configured by a network side to indicate allowing or disabling of the reporting of the updated UE capability information from the UE.

In one embodiments, the initiating the request for reporting the updated UE capability information to the network, includes:

initiating the request for reporting the updated UE capability information to the network through information bits in uplink control information (UCI) on a physical uplink control channel (PUCCH).

The present application further provides a UE capability update method, including:

receiving updated UE capability information sent from a UE when the UE satisfying a preset condition, where the preset condition is to process communication data by using an updated machine learning model, determine at least one performance indicator associated with UE capability, and determine that the UE capability is updated according to the at least one performance indicator; and configuring or scheduling the UE according to the updated UE capability information.

In one embodiments, the receiving the updated UE capability information sent from the UE when the UE satisfying the preset condition, includes:

receiving the updated UE capability information sent from the UE through RRC IE in RRC information when the UE satisfying the preset condition;

where the updated UE capability information includes a mandatory UE capability parameter and an updated UE capability parameter.

In one embodiments, the receiving the updated UE capability information sent from the UE when the UE satisfying the preset condition, includes:

receiving the updated UE capability information reported by the UE via triggering to the network when reporting condition is met; or receiving a request for reporting the updated UE capability information from the UE; and sending a report permission instruction to the UE and receiving the updated UE capability information from the UE, or sending a report rejection instruction to the UE or not sending any instruction to the UE to refuse the UE to report the updated UE capability information.

In one embodiments, the method further includes:

configuring a switch for the UE to indicate allowing or disabling of the reporting of the updated UE capability information;

where the receiving the updated UE capability information reported by the UE via triggering to the network when the reporting condition is met, includes:

receiving the updated UE capability information reported by the UE via triggering to the network when the UE determining that the switch indicates allowing of the reporting of the updated UE capability information.

In one embodiments, the receiving the request for reporting the updated UE capability information from the UE, includes:

receiving the request for reporting the updated UE capability information from the UE through information bits in UCI on a PUCCH.

In one embodiment of the present application provides a UE capability update apparatus, including:

a machine learning model updating device, configured to update a machine learning model for communication data processing;

a performance indicator determination device, configured to determine at least one performance indicator associated with UE capability based on processing of communication data according to the updated machine learning model;

a UE capability information determination device, configured to determine updated UE capability information in response to determining that the UE capability is updated according to the at least one performance indicator; and a UE capability information reporting device, configured to report the updated UE capability information to a network.

The present application further provides a UE capability update apparatus, including:

a UE capability information receiving device, configured to receive updated UE capability information sent from a UE when the UE satisfying a preset condition, where the preset condition is to process communication data by using an updated machine learning model, determine at least one performance indicator associated with UE capability, and determine that the UE capability is updated according to the at least one performance indicator; and a processing device, configured to configure or schedule the UE according to the updated UE capability information.

In one embodiment of the present application provides a UE capability update device, including a memory and a processor, where the memory stores computer programs that are capable of running on the processor, when the computer program are executed by the processor, the processor performs:

updating a machine learning model for communication data processing;

determining at least one performance indicator associated with UE capability based on processing of communication data according to the updated machine learning model;

determining updated UE capability information in response to determining that the UE capability is updated according to the at least one performance indicator; and reporting the updated UE capability information to a network.

In one embodiments, the processor determines that the UE capability is updated according to the at least one performance indicator, including at least one of the following operations:

in response to the at least one performance indicator being greater than a corresponding preset threshold, determining that the UE capability is updated;

in response to a change magnitude of the at least one performance indicator being greater than a corresponding preset threshold, determining that the UE capability is updated.

In one embodiments, the processor determines the updated UE capability information in response to determining that the UE capability is updated according to the at least one performance indicator, including:

determining a UE capability parameter corresponding to the at least one performance indicator according to a corresponding relationship between different UE capability parameters and performance indicators; and determining an updated UE capability parameter.

In one embodiments, the processor reports the updated UE capability information to the network, including:

reporting the updated UE capability information to the network through RRC IE in RRC information;

where the updated UE capability information includes a mandatory UE capability parameter and an updated UE capability parameter.

In one embodiments, the processor reports the updated UE capability information to the network, including:

triggering the reporting of the updated UE capability information to the network when a reporting condition is met; or initiating a request for reporting the updated UE capability information to the network, and reporting the updated UE capability information when receiving a report permission instruction from the network.

In one embodiments, the triggering the reporting of the updated UE capability information to the network when the reporting condition is met, includes:

triggering the reporting of the updated UE capability information to the network in response to determining that a switch indicates allowing of the reporting of the updated UE capability information, where the switch is configured by a network side to indicate allowing or disabling of the reporting of the updated UE capability information from the UE.

In one embodiments, the processor initiates the request for reporting the updated UE capability information to the network, including:

initiating the request for reporting the updated UE capability information to the network through information bits in UCI on a PUCCH.

The present application further provides a UE capability update device, including a memory and a processor, where the memory stores computer programs that are capable of running on the processor, when the computer programs are executed by the processor, the processor performs:

receiving updated UE capability information sent from a UE when the UE satisfying a preset condition, where the preset condition is to process communication data by using an updated machine learning model, determining at least one performance indicator associated with UE capability, and determining that the UE capability is updated according to the at least one performance indicator; and configuring or scheduling the UE according to the updated UE capability information.

In one embodiments, the processor receives the updated UE capability information sent from the UE when the UE satisfying the preset condition, including:

receiving the updated UE capability information sent from the UE through RRC IE in RRC information when the UE satisfying the preset condition;

where the updated UE capability information includes a mandatory UE capability parameter and an updated UE capability parameter.

In one embodiments, the processor receives the updated UE capability information sent from the UE when the UE satisfying the preset condition, including:

receiving the updated UE capability information reported by the UE via triggering to the network when a reporting condition is met; or receiving a request for reporting the updated UE capability information from the UE; and sending a report permission instruction to the UE and receiving the updated UE capability information from the UE; or sending a report rejection instruction to the UE or not sending any instruction to the UE, to refuse the UE to report the updated UE capability information.

In one embodiments, the method further includes:

configuring a switch for the UE to indicate allowing or disabling of the reporting of the updated UE capability information;

where the receiving the updated UE capability information reported by the UE via triggering to the network when the reporting condition is met, includes:

receiving the updated UE capability information reported by the UE via triggering to the network when the UE determining that the switch indicates allowing of the reporting of the updated UE capability information.

In one embodiments, the processor receives the request for reporting the updated UE capability information from the UE, including:

receiving the request for reporting the updated UE capability information from the UE through information bits in UCI on a PUCCH.

In one embodiment of the present application provides a computer-readable storage medium. Computer programs are stored in the computer-readable storage medium, and when the computer programs are executed by a processor, any UE capability update method in the above-mentioned embodiments implemented.

The present application provides UE capability update methods, apparatuses, and devices. The method includes: updating a machine learning model for communication data processing; determining at least one performance indicator associated with UE capability based on processing of communication data according to the updated machine learning model; determining updated UE capability information in response to determining that the UE capability is updated according to the at least one performance indicator; and reporting the updated UE capability information to a network. Using the method provided by the present application, by introducing the method for identifying UE capability changes and reporting updated UE capabilities, the problem of resources waste or unsatisfied service requirements of UE upgrade caused by the network device still scheduling according to original UE capabilities after UE capability upgrades can be solved.

BRIEF DESCRIPTION OF FIGURES

In order to more clearly illustrate the embodiments of the present application, the drawings that need to be used in the description of the embodiments will be briefly introduced below. The drawings in the following description are only some embodiments of the present application.

DETAILED DESCRIPTION

In order to make the embodiments of the present application clearer, the present application will be further described in detail below in conjunction with the accompanying drawings. Apparently, the described embodiments are only part but not all of the embodiments of the present application.

The scenarios described in the embodiments of the present application are to illustrate the embodiments of the application more clearly, and do not constitute limitations on the embodiments of the application. The development of new application scenarios, the embodiments of the present application are also applicable to similar problems.

Figure 1:
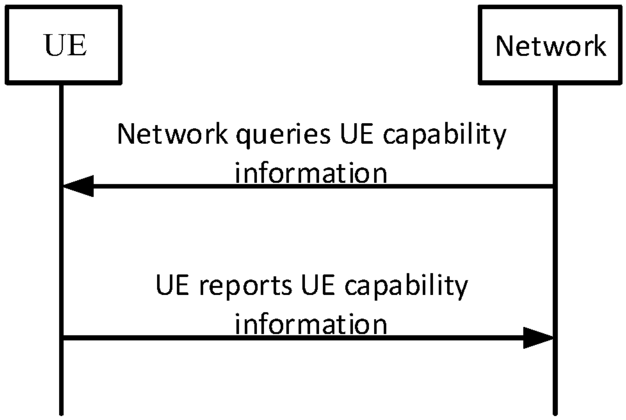
FIG. 1 is a schematic diagram of UE capability reporting in a current 5G system provided by embodiments of the present application.

In the current 5G communication system, as shown in FIG. 1, when a network needs additional UE radio access capability information, the network sends UE capability enquiry to a UE to query UE capability information. The UE reports the UE capability information in response to the query of the network. When configuring the UE or scheduling the UE, the network respects radio access capability parameters reported by the UE.

In the current 5G communication system, it is generally assumed that UE capability will not change after RRC connection and reporting of the UE capability. Therefore, when performing scheduling, the network device does not consider whether the UE capability changes.

In the future $6^{th}$ generation mobile communication technology (6G) communication system, the capabilities of UEs will change with changes in communication environment, user needs and other conditions, and this change may also occur after RRC connection is established. For example, the reported parameter cqi-TableAlt of the UE capability indicates whether the UE supports a target BLER (block error rate) of $10^{-5}$. When artificial intelligence is introduced into the UE, and after the UE updates a machine learning model, the UE that could not support the target BLER of $10^{-5}$ is able to support the target BLER of $10^{-5}$. However, if the network device still assumes that the UE capability will not change, and still schedules the UE according to the UE capability before the change, which can neither fully utilize the UE capability nor support the service requirements of UE upgrade.

Embodiment 1

Figure 2:
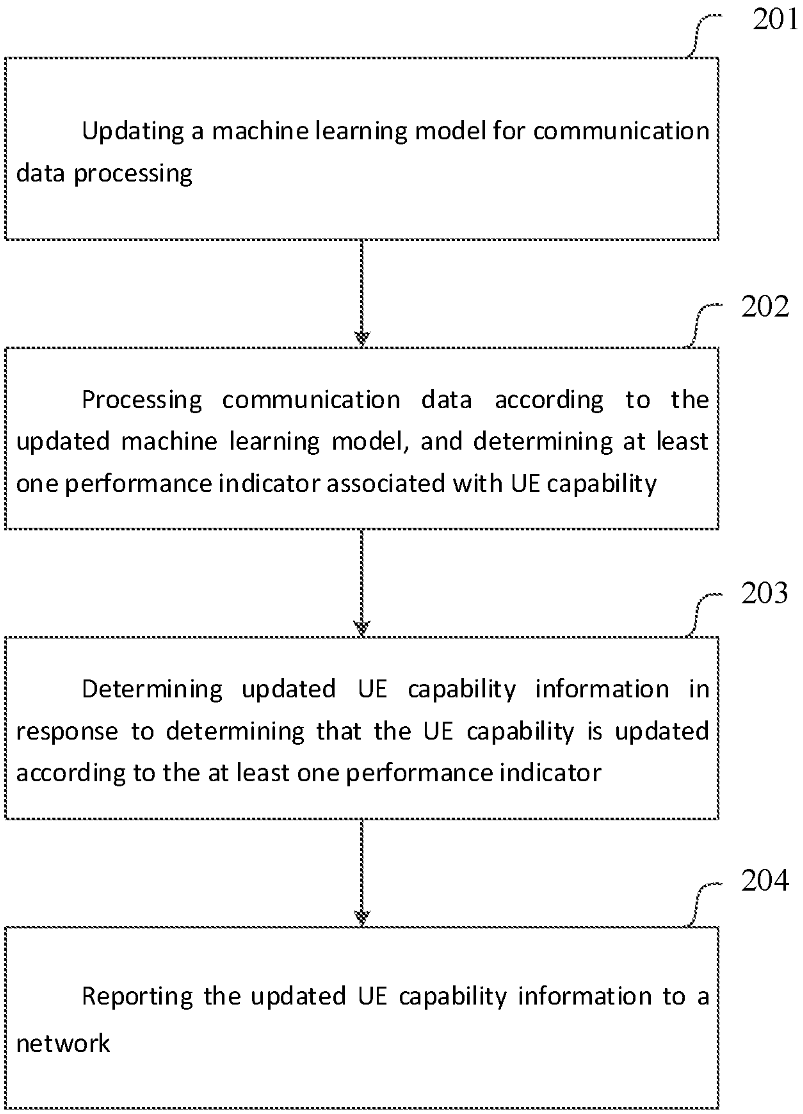
FIG. 2 is a flow chart of a UE capability update method provided by embodiments of the present application.

Embodiments of the present application provide a UE capability update method. By introducing the method for identifying UE capability changes and reporting updated UE capabilities, the problem of resources waste or unsatisfied service requirements of UE upgrade caused by the network device still scheduling according to original UE capabilities after UE capability upgrades can be solved. As shown in FIG. 2, the method includes steps 201-204.

S201, updating a machine learning model for communication data processing.

Here, the machine learning model refers to a neural network model that can realize corresponding functions after sample training. For example, according to a functional device for communication data processing that needs to be realized, the corresponding sample can be collected to train the model, and the machine learning model that realizes the function can be obtained. And subsequently, when there is a new sample, the machine learning model for communication data processing can be updated by using the new sample.

The above update may be performed periodically according to a preset period after the RRC connection is established, or may be an update triggered by an external event.

S202, processing communication data according to the updated machine learning model, and determining at least one performance indicator associated with UE capability.

For example, by using the updated machine learning model to process the communication data, all performance indicators of the updated machine learning model that may affect UE capability are evaluated, and the performance indicator that causes UE capability changes is determined. Here, the number of performance indicators that cause UE capability changes may one or more.

Here, the above evaluation may be performed based on the number of updates, for example, an evaluation is performed every three updates of the machine learning model; or the above evaluation may be performed based on a period of time, for example, an evaluation is performed at intervals, or an evaluation is performed at a fixed time point.

In the embodiments of the present application, the UE capability information may be reflected by defined UE capability parameters, and the UE capability parameters may be determined by at least one corresponding performance indicator. The at least one performance indicator associated with UE capability is one or more performance indicators that influence the UE capability parameters.

S203, determining updated UE capability information in response to determining that the UE capability is updated according to the at least one performance indicator.

In the embodiments of the present application, the UE capability information includes which UE capability parameters are preset according to the protocol. After determining the performance indicator that causes the UE capability update, whether the UE capability is updated may be determined according to the performance indicator.

As an one embodiment, the determining that the UE capability is updated according to the at least one performance indicator, includes at least one of the following operations:

- in response to the at least one performance indicator being greater than a corresponding preset threshold, determining that the UE capability is updated;
- in response to a change amplitude of the at least one performance indicator being greater than a corresponding preset threshold, determining that the UE capability is updated;
- where the preset threshold is a preset value, which may be modified according to requirements.

It is determined that the UE capability is updated, and the corresponding UE capability parameter is obtained according to the performance indicator that causes the UE capability update. This correspondence is preset according to the protocol and may be added according to requirements, and the updated UE capability parameter is reported to the network.

As an one embodiment, the determining the updated UE capability information in response to determining that the UE capability is updated according to the at least one performance indicator, includes:

- determining a UE capability parameter corresponding to the at least one performance indicator according to a corresponding relationship between different UE capability parameters and performance indicators; and
- determining an updated UE capability parameter.

If the determined UE capability parameter is updated, it means that the UE capability information needs to be updated; if the determined UE capability parameter is not updated, it means that the UE capability information does not need to be updated.

S204, reporting the updated UE capability information to a network.

As an one embodiment, the reporting the updated UE capability information to the network, includes:

- triggering the reporting of updated UE capability information to the network when a reporting condition is met; or
- initiating a request for reporting the updated UE capability information to the network, and reporting the updated UE capability information when receiving a report permission instruction from the network.

In the embodiments of the application, the UE reports the updated UE capability information to the network in two ways. A first way is that when the UE meets the reporting condition, it triggers to report the updated UE capability information to the network. A second way is that the UE requests to report the updated UE capability information.

In the first way and the second way, the UE reports the updated UE capability information to the network through radio resource control information elements (RRC IE) in RRC information.

Here, the updated UE capability information includes a mandatory UE capability parameter and an updated UE capability parameter.

For example, the UE capability parameters include a mandatory UE capability parameter and an one UE capability parameter. The updated UE capability information reported to the network must include all mandatory UE capability parameters, and the updated UE capability parameter may be a mandatory UE capability parameter or an one UE capability parameter.

If the updated UE capability parameter is a mandatory UE capability parameter, when reporting the updated UE capability information to the network, only the mandatory UE capability parameter is included in the updated UE capability information.

If the updated UE capability parameter is an one UE capability parameter, when reporting the updated UE capability information to the network, the updated UE capability information includes the mandatory UE capability parameter and the updated one UE capability parameter.

The processes of the first way and the second way are described in detail below.

The First Way

Figure 3:
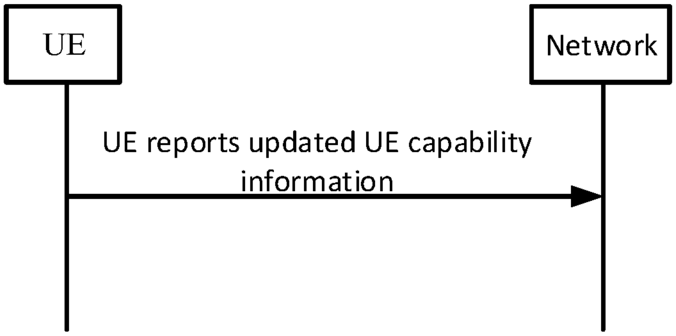
FIG. 3 is a schematic diagram of triggering reporting of updated UE capability information to the network when the UE meets a reporting condition provided by embodiments of the present application.

As shown in FIG. 3, the triggering the reporting of the updated UE capability information to the network when the reporting condition is met, includes:

- triggering the reporting of the updated UE capability information to the network in response to determining that a switch indicates allowing of the reporting of the updated UE capability information, where the switch is configured by a network side to indicate allowing or disabling of the reporting of the updated UE capability information from the UE.

For example, after the RRC connection is established, the UE periodically updates the artificial intelligence model, or triggers an update due to changes in the external environment. The updated machine learning model may have better performance or lower complexity, and the updated machine learning model causes changes of the UE capability information.

Further, the network side configures the switch that indicates that the UE is allowed or disabled to report the updated UE capability information. When the switch is in the state of allowing the reporting of the updated UE capability information, the UE triggers to report the updated UE capability information to the network. When the switch is in the state of disabling the reporting of the updated UE capability information, the UE cannot report the updated UE capability information.

When the UE capability information is updated and the switch is in the state of allowing the reporting of the updated UE capability information, the UE triggers the RRC IE in the RRC information to report the updated UE capability information to the network.

The Second Way

The UE initiates a request for reporting the updated UE capability information to the network, and reports the updated UE capability information when receiving a report permission instruction from the network.

Figure 4:
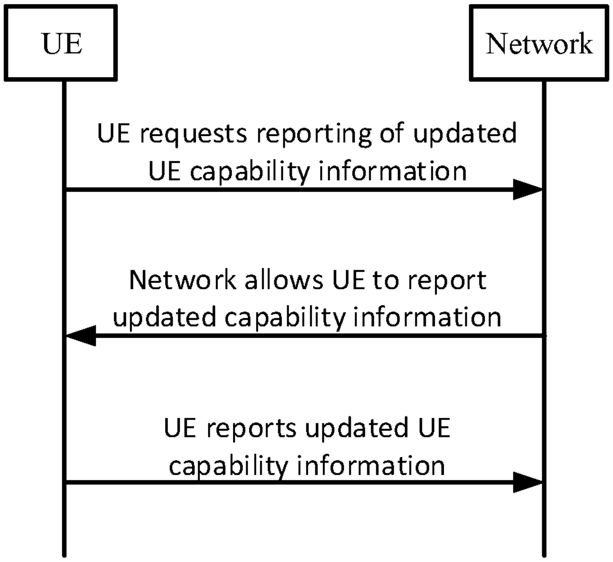
FIG. 4 is a schematic diagram of a UE requesting to report and the network allowing the UE to report updated UE capability information provided by embodiments of the present application.
Figure 5:
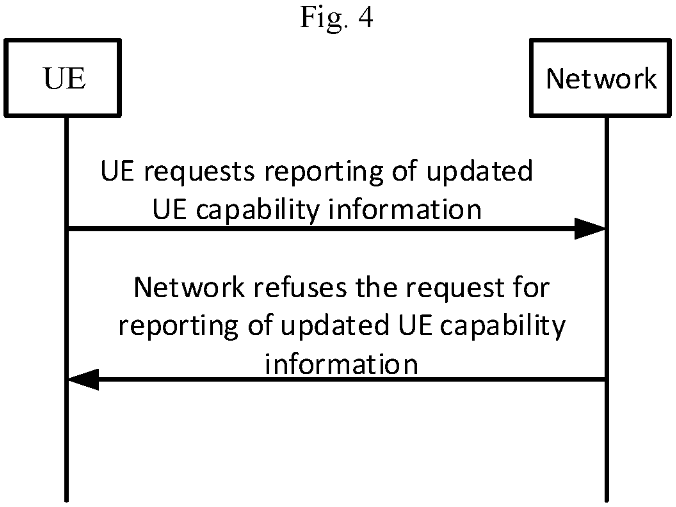
FIG. 5 is a schematic diagram of a UE requesting to report but the network rejecting the UE to report updated UE capability information provided by embodiments of the present application.

As shown in FIG. 4 and FIG. 5, the UE sends a request to the network for reporting the updated UE capability information. When the network allows the UE to report the updated UE capability information, it sends a permission instruction to the UE. In response to the permission instruction from the network, the UE reports the updated UE capability information to the network. When the network refuses the UE to report the updated UE capability information, it rejects the UE's request to report the updated UE capability information by sending a rejection instruction or not sending an instruction, and the UE does not report the updated UE capability information.

For example, after the RRC connection is established, the UE periodically updates the artificial intelligence model, or triggers an update due to changes in the external environment. The updated machine learning model may have better performance or lower complexity, and the updated machine learning model will cause changes of the UE capability information.

After the UE capability information is updated, the UE initiates a request for reporting the updated UE capability information to the network.

As an one embodiment, initiating a request to the network for reporting updated UE capability information includes:

- initiating the request for reporting the updated UE capability information to the network through information bits in uplink control information (UCI) on a physical uplink control channel (PUCCH).

If the report permission instruction sent by the network through the PDCCH is received, the updated UE capability information is reported by the RRC IE in the RRC information.

If the report rejection instruction sent by the network through the PDCCH is received, or no instruction is received from the network, the updated UE capability information will not be reported.

Figure 6:
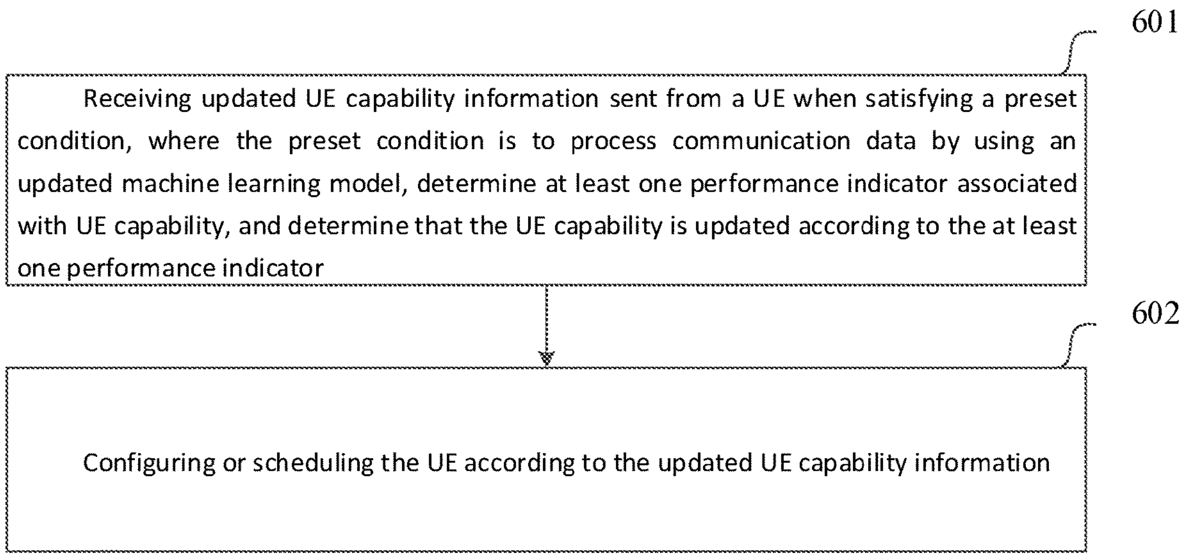
FIG. 6 is a flow chart of another UE capability update method provided by embodiments of the present application.

The embodiments of the present application also provide a UE capability update method. By introducing the method for identifying UE capability changes and reporting updated UE capabilities, the problem of resources waste or unsatisfied service requirements of UE upgrade caused by the network device still scheduling according to original UE capabilities after UE capability upgrades can be solved. As shown in FIG. 6, the method includes the following steps S601 and S602.

S601, receiving updated UE capability information sent from a UE when satisfying a preset condition, where the preset condition is to process communication data by using an updated machine learning model, determine at least one performance indicator associated with UE capability, and determine that the UE capability is updated according to the at least one performance indicator.

As an one embodiment, the receiving the updated UE capability information sent from the UE when satisfying the preset condition, includes:

- receiving the updated UE capability information reported by the UE via triggering to the network when a reporting condition is met; or
- receiving a request for reporting the updated UE capability information from the UE; sending a report permission instruction to the UE, and receiving the updated UE capability information from the UE, or sending a report rejection instruction or not sending any instruction to the UE, and refusing the UE to report the updated UE capability information.

In the embodiments of the present application, the network receives the updated UE capability information reported by the UE in two ways. A third way is that the network receives the updated UE capability information reported by the UE when the UE meets the reporting condition. A fourth way is that the network receives a request for the updated UE capability information reported by the UE, and sends a report permission instruction or a report rejection instruction to the UE.

In the third way and the fourth way, the updated UE capability information sent by the UE through RRC IE in RRC information when satisfying the preset condition is received.

Here, the updated UE capability information includes a mandatory UE capability parameter and an updated UE capability parameter.

For example, the UE capability parameters include a mandatory UE capability parameter(s) and an one UE capability parameter(s). The updated UE capability information sent by the UE when satisfying the preset condition must include all mandatory UE capability parameters. The updated UE capability parameter may be a mandatory UE capability parameter or an one UE capability parameter.

If the updated UE capability parameter is a mandatory UE capability parameter, when receiving the updated UE capability information sent by the UE when meeting the preset condition, the updated UE capability information only includes the mandatory UE capability parameter(s).

If the updated UE capability parameter is an one UE capability parameter, when receiving the updated UE capability information sent by the UE when meeting the preset condition, the updated UE capability information includes the mandatory UE capability parameter(s) and the updated one UE capability parameter.

S602, configuring or scheduling the UE according to the updated UE capability information.

The processes of the third way and the fourth way are described in detail below.

The Third Way

The receiving by the network the updated UE capability information reported by the UE via triggering to the network when the reporting condition is met, includes:

- configuring a switch for the UE to indicate allowing or disabling of the reporting of the updated UE capability information;
- where the receiving the updated UE capability information reported by the UE via triggering to the network when the reporting condition is met, includes:
- receiving the updated UE capability information reported by the UE via triggering to the network when the UE determining that the switch indicates allowing of the reporting of the updated UE capability information.

For example, after the RRC connection is established, the UE periodically updates the artificial intelligence model, or triggers an update due to changes in the external environment. The updated machine learning model may have better performance or lower complexity, and the updated machine learning model causes changes of the UE capability information.

Further, the network side configures a switch that indicates that the UE is allowed or disabled to report the updated UE capability information. When the switch is in a state of allowing reporting of the updated UE capability information, the UE is allowed to trigger reporting of the updated UE capability information to the network. When the switch is in a state of disabling reporting of the updated UE capability information, the UE is not allowed to trigger the reporting of the updated UE capability information to the network.

When the UE capability information is updated and the switch is in the state of allowing the reporting of the updated UE capability information, the updated UE capability information reported by the UE to the network via RRC IE in RRC information is received.

The Fourth Way

A request for reporting the updated UE capability information from the UE is received. A report permission instruction is sent to the UE, and the updated UE capability information from the UE is received; or a report rejection instruction is sent to the UE or no instruction is sent to the UE, and the UE is refused to report the updated UE capability information.

For example, after the RRC connection is established, the UE periodically updates the artificial intelligence model, or triggers an update due to changes in the external environment. The updated machine learning model may have better performance or lower complexity, and the updated machine learning model will cause changes of the UE capability information.

After the UE capability information is updated, the network receives a request for reporting the updated UE capability information from the UE.

As an one embodiment, the receiving the request for reporting the updated UE capability information from the UE, includes:

- receiving the request for reporting the updated UE capability information from the UE through information bits in uplink control information (UCI) on a physical uplink control channel (PUCCH).

According to the received request for reporting the updated UE capability information from the UE, it is determined whether the UE needs to report the updated UE capability information.

If it is determined that the UE needs to report the updated UE capability information, a report permission instruction is sent through PDCCH, and the updated UE capability information reported by the UE is received.

If it is determined that the UE does not need to report the updated UE capability information, a report rejection instruction is sent through the PDCCH, or no instruction is sent, and the request for reporting the updated UE capability information from the UE is rejected.

When the UE meets the reporting condition, it is triggered to report the updated UE capability information to the network. The main steps are as follows.

Step 1, the network configures a switch for indicating allowing or disabling the reporting of the updated UE capability information, and controls whether the UE is allowed to trigger the reporting of the updated UE capability information.

At least one of the functions such as modulation and demodulation, channel estimation, signal detection, encoding and decoding, etc., of the network and the UE is implemented by a deep learning algorithm. A good machine learning model will bring lower complexity, that is, lower processing delay.

The network and the UE periodically update the above machine learning model, or update the above machine learning model triggered by the communication environment or communication performance degradation.

Step 2, after the UE updates the machine learning model, UE performance indicator, i.e., PDSCH (Physical Downlink Shared Channel) processing time, is calculated based on the updated model. If the PDSCH processing time of the UE becomes smaller and is less than a threshold value corresponding to a PDSCH processing capability 2, it is determined that the UE capability is updated.

Step 3, according to the change of the processing capability of PDSCH, it is determined that the UE capability parameter is upgraded from PDSCH processing capability 1 to PDSCH processing capability 2.

Step 4, the UE capability parameter in the FeatureSet-Downlink IE in UE IE is updated from pdsch-Processing-Type1 to pdsch-ProcessingType2, and other mandatory UE capability parameters are kept unchanged.

Step 5: When determining that the switch configured by the network for indicating allowing or disabling the reporting of the updated UE capability information is in the state of allowing the reporting of the updated UE capability information, the reporting is performed through the RRC IE in the RRC information.

The UE requests to report the updated UE capability information, the main steps are as follows.

Step 1, at least one of functional devices, such as modulation and demodulation, channel estimation, signal detection, and encoding and decoding, etc., of the base station and UE, is implemented through a deep learning algorithm, or both the base station and the UE adopt an end-to-end design, that is, use a depth neural network to replace the traditional communication devices. A good machine learning model will bring good block error rate (BLER) performance.

The network and the terminal periodically update the above-mentioned machine learning model, or update the above-mentioned machine learning model triggered by the communication environment or communication performance degradation.

Step 2, after the UE updates the machine learning model, if the UE performance indicator BLER performance is from higher than 10-5 to lower than 10-5, and the performance is relatively stable, it is determined that the UE capability is updated.

Step 3, according to the change of BLER performance, it is determined that the UE capability parameter cqi-TableAlt in the Phy-Parameters IE of the RRC IE is updated from not supported to supported, and other mandatory UE capability parameters remain unchanged.

Step 4, the network side sets a UE capability update timer, which can be set to run within a set period of time, or set to be triggered according to a specific event or a set time.

Step 5, the UE initiates a request for reporting the updated UE capability information to the network through 1 bit in the UCI on the PUCCH.

Step 6: After receiving the request, the network side determines whether to allow the UE to report the updated UE capability information according to whether the UE capability update timer is running. For example, when the UE capability update timer is not running, the base station allows the UE to report the updated UE capability information, and a report permission instruction is sent through the PDCCH.

Step 7: After receiving the report permission instruction, the UE reports through the RRC IE in the RRC information.

Embodiment 2

UE capability update methods in the present application are described above, and apparatuses for performing the above UE capability update methods are described below.

Figure 7:
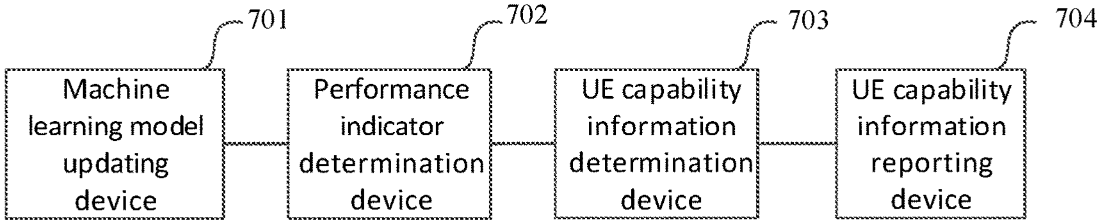
FIG. 7 is a schematic diagram of a UE capability update apparatus provided by embodiments of the present application.

As shown in FIG. 7, embodiments of the present application provide a UE capability update apparatus, including:

a machine learning model updating device 701, configured to update a machine learning model for communication data processing;

a performance indicator determination device 702, configured to process communication data according to the updated machine learning model and determine at least one performance indicator associated with UE capability;

a UE capability information determination device 703, configured to determine updated UE capability information in response to determining that the UE capability is updated according to the at least one performance indicator; and a UE capability information reporting device 704, configured to report the updated UE capability information to a network.

In one embodiment, the UE capability information determination device is configured to determine that the UE capability is updated according to the at least one performance indicator, through at least one of the following operations:

in response to the at least one performance indicator being greater than a corresponding preset threshold, determining that the UE capability is updated;

in response to a change magnitude of the at least one performance indicator being greater than a corresponding preset threshold, determining that the UE capability is updated.

In one embodiment, the UE capability information determination device is configured to determine the updated UE capability information in response to determining that the UE capability is updated according to the at least one performance indicator, which includes:

determining a UE capability parameter corresponding to the at least one performance indicator according to a corresponding relationship between different UE capability parameters and performance indicators; and determining an updated UE capability parameter.

In one embodiment, the UE capability information reporting device is configured to report the updated UE capability information to the network, which includes:

reporting the updated UE capability information to the network through RRC IE in RRC information;

where the updated UE capability information includes a mandatory UE capability parameter and an updated UE capability parameter.

In one embodiment, the UE capability information reporting device is configured to report the updated UE capability information to the network, which includes:

triggering the reporting of updated UE capability information to the network when a reporting condition is met; or initiating a request for reporting the updated UE capability information to the network, and reporting the updated UE capability information when receiving a report permission instruction from the network.

In one embodiment, the UE capability information reporting device is configured to trigger the reporting of the updated UE capability information to the network when the reporting condition is met, including:

triggering the reporting of the updated UE capability information to the network in response to determining that a switch indicates allowing of the reporting of the updated UE capability information, where the switch is configured by a network side to indicate allowing or disabling of the reporting of the updated UE capability information from the UE.

In one embodiment, the UE capability information reporting device is configured to initiate a request for reporting the updated UE capability information to the network, which includes:

initiating the request for reporting the updated UE capability information to the network through information bits in UCI on PUCCH.

Figure 8:
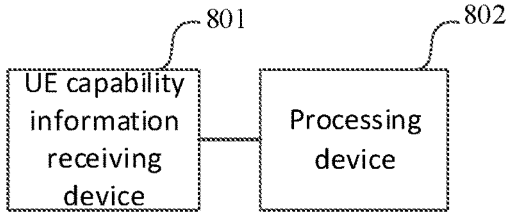
FIG. 8 is a schematic diagram of another UE capability update apparatus provided by embodiments of the present application.

As shown in FIG. 8, the present application further provides a UE capability update apparatus, including:

a UE capability information receiving device 801, configured to receive updated UE capability information sent from a UE when satisfying a preset condition, where the preset condition is to process communication data by using an updated machine learning model, determine at least one performance indicator associated with UE capability, and determine that the UE capability is updated according to the at least one performance indicator; and a processing device 802, configured to configure or schedule the UE according to the updated UE capability information.

In one embodiment, the UE capability information receiving device is configured to receive the updated UE capability information sent from the UE when satisfying the preset condition, which includes:

receiving the updated UE capability information sent from the UE through RRC IE in RRC information when satisfying the preset condition;

where the updated UE capability information includes a mandatory UE capability parameter and an updated UE capability parameter.

In one embodiment, the UE capability information receiving device is configured to receive the updated UE capability information sent from the UE when satisfying the preset condition, which includes:

receiving the updated UE capability information reported by the UE via triggering to the network when the reporting condition is met; or receiving a request for reporting the updated UE capability information from the UE; sending a report permission instruction to the UE, and receiving the updated UE capability information from the UE, or sending a report rejection instruction to the UE or not sending any instruction to the UE, and refusing the UE to report the updated UE capability information.

In one embodiment, the following is further included:

configuring a switch for the UE to indicate allowing or disabling of the reporting of the updated UE capability information;

where the receiving the updated UE capability information reported by the UE via triggering to the network when the reporting condition is met, includes:

receiving the updated UE capability information reported by the UE via triggering to the network when the UE determining that the switch indicates allowing of the reporting of the updated UE capability information.

In one embodiment, the UE capability information receiving device receives the request for reporting the updated UE capability information from the UE, which includes:

receiving the request for reporting the updated UE capability information from the UE through information bits in UCI on a PUCCH.

Embodiment 3

Figure 9:
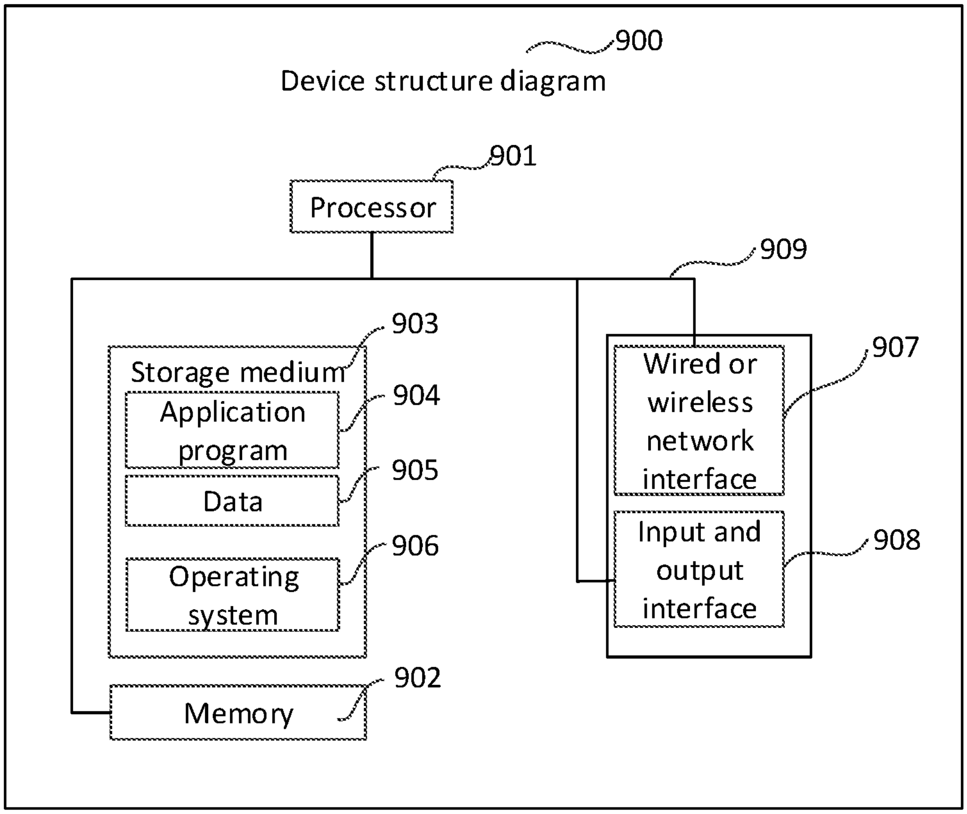
FIG. 9 is a schematic diagram of a UE capability update device provided by embodiments of the present application.

As shown in FIG. 9, embodiments of the present application provide a UE capability update device, including:

at least one processor 901 and at least one memory 902, and a bus system 909.

The memory stores program codes, and when the program codes are executed by the processor, the processor performs the following processes:

updating a machine learning model for communication data processing;

processing communication data according to the updated machine learning model, and determining at least one performance indicator associated with UE capability;

determining updated UE capability information in response to determining that the UE capability is updated according to the at least one performance indicator; and reporting the updated UE capability information to a network.

FIG. 9 is a schematic diagram of a UE capability update device in an embodiment of the present application. The device 900 may have relatively large differences due to different configurations or performances, and may include one or more processors (central processing units, CPU) 901 (e.g., one or more processors) and memory 902, one or more storage medium 903 (e.g., one or more mass storage devices) for storing application programs 904 or data 905. Here, the memory 902 and the storage medium 903 may be temporary storage or persistent storage. The programs stored in the storage medium 903 may include one or more devices (not shown in the figures), and each device may include a series of instruction operations for the information processing device. Furthermore, the processor 901 may be configured to communicate with the storage medium 903, and execute a series of instruction operations in the storage medium 903 on the device 900.

The device 900 may also include one or more wired or wireless network interfaces 907, one or more input and output interfaces 908, and/or, one or more operating systems 906, such as Windows Server, Mac OS X, Unix, Linux, FreeBSD, etc.

In one embodiment, the processor determines that UE capability is updated according to the at least one performance indicator, which includes at least one of the following operations:

in response to the at least one performance indicator being greater than a corresponding preset threshold, determining that the UE capability is updated;

in response to a change magnitude of the at least one performance indicator being greater than a corresponding preset threshold, determining that the UE capability is updated.

In one embodiment, the processor determines that the updated UE capability information in response to determining that the UE capability is updated according to the at least one performance indicator, which includes:

determining a UE capability parameter corresponding to the at least one performance indicator according to a corresponding relationship between different UE capability parameters and performance indicators; and determining an updated UE capability parameter.

In one embodiment, the processor reports the updated UE capability information to the network, including:

reporting the updated UE capability information to the network through RRC IE in RRC information;

where the updated UE capability information includes a mandatory UE capability parameter and an updated UE capability parameter.

In one embodiment, the processor reports the updated UE capability information to the network, including:

triggering the reporting of the updated UE capability information to the network when a reporting condition is met; or initiating a request for reporting the updated UE capability information to the network, and reporting the updated UE capability information when receiving a report permission instruction from the network.

In one embodiment, the triggering the reporting of the updated UE capability information to the network when the reporting condition is met, includes:

triggering the reporting of the updated UE capability information to the network in response to determining that a switch indicates allowing of the reporting of the updated UE capability information, where the switch is configured by a network side to indicate allowing or disabling of the reporting of the updated UE capability information from the UE.

In one embodiment, the processor initiates the request for reporting the updated UE capability information to the network, including:

initiating the request for reporting the updated UE capability information to the network through information bits in UCI on a PUCCH.

Figure 10:
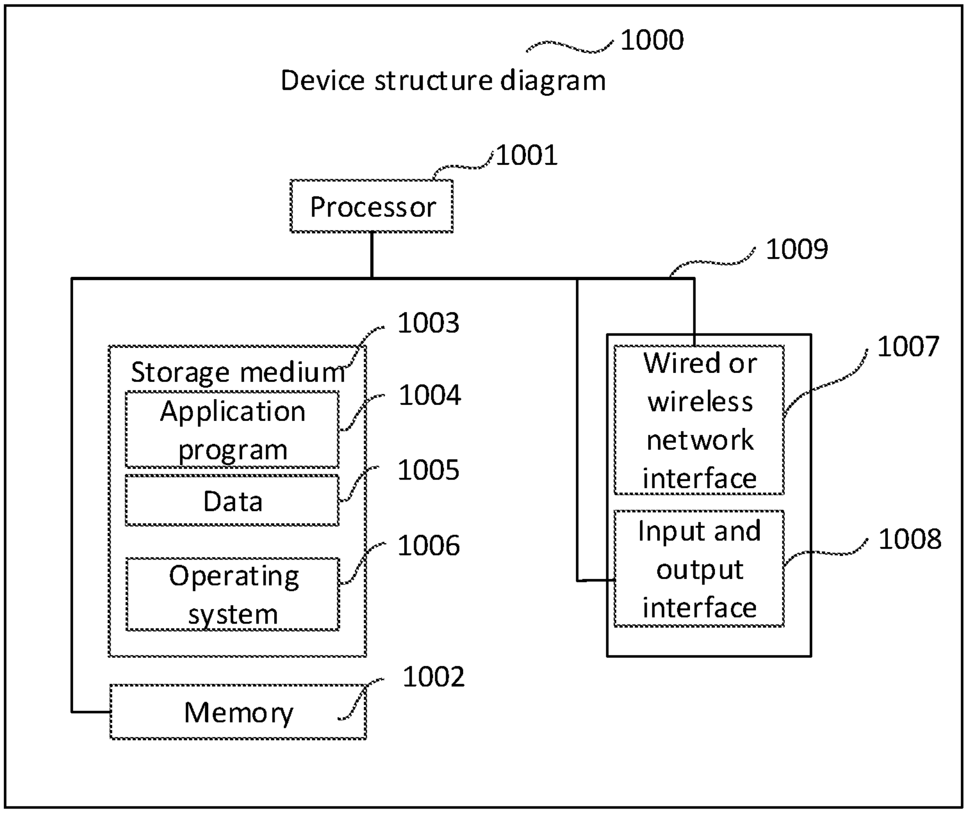
FIG. 10 is a schematic diagram of another UE capability update device provided by embodiments of the present application.

As shown in FIG. 10, the embodiments of the present application provide a UE capability update device, including:

at least one processor 1001 and at least one memory 1002, and a bus system 1009.

Here, the memory stores program codes, and when the program codes are executed by the processor, the processor is caused to perform the following processes:

receiving updated UE capability information sent from a UE when satisfying a preset condition, where the preset condition is to process communication data by using an updated machine learning model, determining at least one performance indicator associated with UE capability, and determining that the UE capability is updated according to the at least one performance indicator; and configuring or scheduling the UE according to the updated UE capability information.

FIG. 10 is a schematic diagram of a UE capability update device in an embodiment of the present application. The device 1000 may have relatively large differences due to different configurations or performances, and may include one or more processors (central processing units, CPU) 1001 (e.g., one or more processors) and memory 1002, one or more storage medium 1003 (e.g., one or more mass storage devices) for storing application programs 1004 or data 1005. Here, the memory 1002 and the storage medium 1003 may be temporary storage or persistent storage. The program stored in the storage medium 1003 may include one or more devices (not shown in the figures), and each device may include a series of instruction operations for the information processing device. Furthermore, the processor 1001 may be configured to communicate with the storage medium 1003, and execute a series of instruction operations in the storage medium 1003 on the device 1000.

The device 1000 may also include one or more wired or wireless network interfaces 1007, one or more input and output interfaces 1008, and/or, one or more operating systems 1006, such as Windows Server, Mac OS X, Unix, Linux, FreeBSD, etc.

In one embodiment, the processor receives the updated UE capability information sent from the UE when satisfying the preset condition, including:

receiving the updated UE capability information sent from the UE through RRC IE in RRC information when satisfying the preset condition;

where the updated UE capability information includes a mandatory UE capability parameter and an updated UE capability parameter.

In one embodiment, the processor receives the updated UE capability information sent from the UE when satisfying the preset condition, including:

receiving the updated UE capability information reported by the UE via triggering to the network when a reporting condition is met; or receiving a request for reporting the updated UE capability information from the UE; sending a report permission instruction to the UE, and receiving the updated UE capability information from the UE, or sending a report rejection instruction to the UE or not sending any instruction to the UE, and refusing the UE to report the updated UE capability information.

In one embodiment, the following is further included:

configuring a switch for the UE to indicate allowing or disabling of the reporting of the updated UE capability information;

where the receiving the updated UE capability information reported by the UE via triggering to the network when the reporting condition is met, includes:

receiving the updated UE capability information reported by the UE via triggering to the network when the UE determining that the switch indicates allowing of the reporting of the updated UE capability information.

In one embodiment, the processor receives the request for reporting the updated UE capability information from the UE, including:

receiving the request for reporting the updated UE capability information from the UE through information bits in UCI on a PUCCH.

Embodiment 4

Embodiments of the present application further provide a computer-readable storage medium, including instructions, which, when run on a computer, cause the computer to execute the UE capability update methods provided in the foregoing embodiments.

Embodiments of the present application further provide a computer program product, including computer programs. The computer programs include program instructions, and when the program instructions are executed by an electronic device, the electronic device is caused to perform the UE capability update methods provided by the above embodiments.

For the convenience and brevity of the description, the specific working process of the above-described devices and devices can refer to the corresponding process in the foregoing method embodiments, which will not be repeated herein.

In the several embodiments provided in the present application, it should be understood that the disclosed system, device and method can be implemented in other ways. For example, the device embodiments described above are only illustrative. For example, the division of the devices is only a logical function division. In one embodiment, there may be other division methods. For example, multiple devices or components can be combined or may be integrated into another system, or some features may be ignored, or not implemented. Further, the mutual coupling or direct coupling or communication connection shown or discussed may be through some interfaces, and the indirect coupling or communication connection of devices or devices may be in electrical, mechanical or other forms.

The devices described as separate components may or may not be physically separated, and the components displayed as devices may or may not be physical devices, that is, they may be located in one place, or may be distributed to multiple network devices. Part or all of the devices can be selected according to actual needs to achieve the purpose of the solution of the embodiments.

In addition, each functional device in each embodiment of the present application may be integrated into one processing device, each device may exist separately physically, or two or more devices may be integrated into one device. The above-mentioned integrated modules can be implemented in the form of hardware or in the form of software function modules. If the integrated modules are realized in the form of software function modules and sold or used as independent products, they can be stored in a computer-readable storage medium.

In the above embodiments, all or part of them may be implemented by software, hardware, firmware or any combination thereof. When implemented using software, it may be implemented in whole or in part in the form of a computer program product.

The computer program product includes one or more computer instructions. When the computer program instructions are loaded and executed on the computer, the processes or functions according to the embodiments of the present disclosure will be generated in whole or in part. The computer can be a general purpose computer, a special purpose computer, a computer network, or other programmable devices. The computer instructions may be stored in or transmitted from one computer-readable storage medium to another computer-readable storage medium, for example, the computer instructions may be transmitted from a website, computer, server, or data center to another website site, computer, server, or data center by wired (e.g., coaxial cable, optical fiber, digital subscriber line (DSL)) or wireless (e.g., infrared, wireless, microwave, etc.). The computer-readable storage medium may be any available medium that can be stored by a computer, or a data storage device such as a server or a data center integrated with one or more available media. The available medium may be a magnetic medium (such as a floppy disk, a hard disk, or a magnetic tape), an optical medium (such as a DVD), or a semiconductor medium (such as a solid state disk (solid state disk, SSD)) and the like.

The embodiments of the present application have been introduced in detail above. In the present application, embodiments have been used to illustrate the principles and implementation methods of the present application. The descriptions of the above embodiments are only used to help understand the embodiments of the present application. Based on the idea of the present application, there will be changes in the specific implementation and application scope. In summary, the content of this specification should not be construed as limiting the application.

What is claimed is:

1. A user equipment (UE) capability update method, comprising:

updating a machine learning model for communication data processing;

determining at least one performance indicator associated with UE capability based on processing of communication data according to the updated machine learning model;

determining updated UE capability information in response to determining that the UE capability is updated according to the at least one performance indicator; and reporting the updated UE capability information to a network;

wherein the updated UE capability information comprises a mandatory UE capability parameter and an updated UE capability parameter.

2. The method according to claim 1, wherein said determining that the UE capability is updated according to the at least one performance indicator, comprises at least one of following operations:

in response to the at least one performance indicator being greater than a corresponding preset threshold, determining that the UE capability is updated;

in response to a change magnitude of the at least one performance indicator being greater than a corresponding preset threshold, determining that the UE capability is updated.

3. The method according to claim 1, wherein said determining the updated UE capability information in response to determining that the UE capability is updated according to the at least one performance indicator, comprises:

determining a UE capability parameter corresponding to the at least one performance indicator according to a corresponding relationship between different UE capability parameters and performance indicators; and determining an updated UE capability parameter.

4. The method according to claim 1, wherein said reporting the updated UE capability information to the network, comprises:

reporting the updated UE capability information to the network through radio resource control information elements, RRC IEs, in RRC information;

wherein the updated UE capability information comprises a mandatory UE capability parameter and an updated UE capability parameter.

5. The method according to claim 1, wherein said reporting the updated UE capability information to the network, comprises:

triggering the reporting of the updated UE capability information to the network when a reporting condition is met; or initiating a request for reporting the updated UE capability information to the network, and reporting the updated UE capability information when receiving a report permission instruction from the network.

6. The method according to claim 5, wherein said triggering the reporting of the updated UE capability information to the network when the reporting condition is met, comprises:

triggering the reporting of the updated UE capability information to the network in response to determining that a switch indicates allowing of the reporting of the updated UE capability information, wherein the switch is configured by a network side to indicate allowing or disabling of the reporting of the updated UE capability information from the UE.

7. The method according to claim 5, wherein said initiating the request for reporting the updated UE capability information to the network, includes:

initiating the request for reporting the updated UE capability information to the network through information bits in uplink control information, UCI, on a physical uplink control channel, PUCCH.

8. A user equipment (UE) capability update method, comprising:

receiving updated UE capability information sent from a UE when the UE satisfying a preset condition, wherein the preset condition is to process communication data by using an updated machine learning model, determine at least one performance indicator associated with UE capability, and determine that the UE capability is updated according to the at least one performance indicator; and configuring or scheduling the UE according to the updated UE capability information;

wherein the updated UE capability information comprises a mandatory UE capability parameter and an updated UE capability parameter.

9. The method according to claim 8, wherein said receiving the updated UE capability information sent from the UE when the UE satisfying the preset condition, comprises:

receiving the updated UE capability information sent from the UE through RRC IE in RRC information when the UE satisfying the preset condition;

wherein the updated UE capability information comprises a mandatory UE capability parameter and an updated UE capability parameter.

10. The method according to claim 8, wherein said receiving the updated UE capability information sent from the UE when the UE satisfying the preset condition, comprises:

receiving the updated UE capability information reported by the UE via triggering to the network when a reporting condition is met; or receiving a request for reporting the updated UE capability information from the UE; and sending a report permission instruction to the UE and receiving the updated UE capability information from the UE, or sending a report rejection instruction to the UE or not sending any instruction to the UE and refusing the UE to report the updated UE capability information.

11. The method according to claim 10, further comprising:

configuring a switch for the UE to indicate allowing or disabling of the reporting of the updated UE capability information;

wherein said receiving the updated UE capability information reported by the UE via triggering to the network when the reporting condition is met, comprises:

receiving the updated UE capability information reported by the UE via triggering to the network when the UE determining that the switch indicates allowing of the reporting of the updated UE capability information.

12. The method according to claim 10, wherein said receiving the request for reporting the updated UE capability information from the UE, comprises:

receiving the request for reporting the updated UE capability information from the UE through information bits in uplink control information (UCI) on a physical uplink control channel (PUCCH).

13. A UE capability update device, comprising a memory and a processor, wherein the memory stores computer programs that are capable of running on the processor, and when the computer programs are executed by the processor, the processor performs the method according to claim 8.

14. A user equipment (UE) capability update device, comprising a memory and a processor, wherein the memory stores computer programs that are capable of running on the processor, and when the computer programs are executed by the processor, the processor performs:

updating a machine learning model for communication data processing;

determining at least one performance indicator associated with UE capability based on processing of communication data according to the updated machine learning model;

determining updated UE capability information in response to determining that the UE capability is updated according to the at least one performance indicator; and reporting the updated UE capability information to a network;

wherein the updated UE capability information comprises a mandatory UE capability parameter and an updated UE capability parameter.

15. The device according to claim 14, wherein the processor determines that the UE capability is updated according to the at least one performance indicator, comprising at least one of following operations:

in response to the at least one performance indicator being greater than a corresponding preset threshold, determining that the UE capability is updated;

in response to a change magnitude of the at least one performance indicator being greater than a corresponding preset threshold, determining that the UE capability is updated.

16. The device according to claim 14, wherein the processor determines the updated UE capability information in response to determining that the UE capability is updated according to the at least one performance indicator, comprising:

determining a UE capability parameter corresponding to the at least one performance indicator according to a corresponding relationship between different UE capability parameters and performance indicators; and determining an updated UE capability parameter.

17. The device according to claim 14, wherein the processor reports the updated UE capability information to the network, comprising:

reporting the updated UE capability information to the network through RRC IE in RRC information;

wherein the updated UE capability information comprises a mandatory UE capability parameter and an updated UE capability parameter.

18. The device according to claim 14, wherein the processor reports the updated UE capability information to the network, comprising:

triggering the reporting of the updated UE capability information to the network when a reporting condition is met; or initiating a request for reporting the updated UE capability information to the network, and reporting the updated UE capability information when receiving a report permission instruction from the network.

19. The device according to claim 18, wherein said triggering the reporting of the updated UE capability information to the network when the reporting condition is met, comprises:

triggering the reporting of the updated UE capability information to the network in response to determining that a switch indicates allowing of the reporting of the updated UE capability information, wherein the switch is configured by a network side to indicate allowing or disabling of the reporting of the updated UE capability information from the UE.

20. The device according to claim 18, wherein the processor initiates the request for reporting the updated UE capability information to the network, comprising:

initiating the request for reporting the updated UE capability information to the network through information bits in uplink control information (UCI) on a physical uplink control channel PUCCH).

* * * * *